United States Patent
Roziere

(10) Patent No.: US 8,770,033 B2
(45) Date of Patent: Jul. 8, 2014

(54) CAPACTIVE PRESSURE SENSOR INCORPORATING A TEMPERATURE MEASUREMENT AND COMPATIBLE WITH HOT ENVIRONMENTS

(75) Inventor: Didier Roziere, Nimes (FR)

(73) Assignee: Nanotec Solution, Nimes (FR)

( * ) Notice: Subject to any disclaimer, the term of this patent is extended or adjusted under 35 U.S.C. 154(b) by 208 days.

(21) Appl. No.: 13/388,606

(22) PCT Filed: Aug. 6, 2010

(86) PCT No.: PCT/FR2010/051672
§ 371 (c)(1),
(2), (4) Date: Feb. 2, 2012

(87) PCT Pub. No.: WO2011/015797
PCT Pub. Date: Feb. 10, 2011

(65) Prior Publication Data
US 2012/0132006 A1    May 31, 2012

(30) Foreign Application Priority Data

Aug. 7, 2009 (FR) .................................. 09 55585

(51) Int. Cl.
*G01L 9/12* (2006.01)
(52) U.S. Cl.
USPC ............................................. 73/718; 73/724
(58) Field of Classification Search
USPC .................................................. 73/700–756
See application file for complete search history.

(56) References Cited

U.S. PATENT DOCUMENTS

| | | | |
|---|---|---|---|
| 3,948,102 A | 4/1976 | Coon | |
| 4,950,084 A | 8/1990 | Bailleul et al. | |
| 5,359,491 A | 10/1994 | Coville et al. | |
| 5,637,802 A * | 6/1997 | Frick et al. | 73/724 |
| 8,561,471 B2 * | 10/2013 | Blankenship | 73/724 |
| 2004/0075442 A1 | 4/2004 | Iannello et al. | |
| 2008/0231292 A1 | 9/2008 | Ossart et al. | |
| 2012/0031190 A1 * | 2/2012 | Blankenship | 73/753 |

FOREIGN PATENT DOCUMENTS

| | | |
|---|---|---|
| EP | 2075563 | 7/2009 |
| FR | 2608751 | 6/1988 |
| FR | 2756048 | 5/1998 |
| WO | 92/22794 | 12/1992 |

* cited by examiner

*Primary Examiner* — Andre Allen
(74) *Attorney, Agent, or Firm* — Greer, Burns & Crain, Ltd.

(57) ABSTRACT

A capacitive measurement device including first measurement device designed to carry out a first measurement function in relation to a nearby object, the first measurement device including a body and, a capacity electrode, both of a substantially conductive material, and a guard electrode placed between the body and the capacitive electrode and insulated from the body on the one hand and from the capacitive electrode on the other hand by dielectric elements; an excitation apparatus which maintains the capacitive electrode and the guard electrode to a desired AC electrical potential; a first electronic apparatus, connected to the capacitive and guard electrodes, for measuring the capacitance between the capacitive electrode and the object; and a second measurement device designed to carry out a second measurement function, which are located in the vicinity of either the capacitive or guard electrode, and maintained by the excitation apparatus to a desired AC electrical potential.

15 Claims, 2 Drawing Sheets

US 8,770,033 B2

Figure 1:
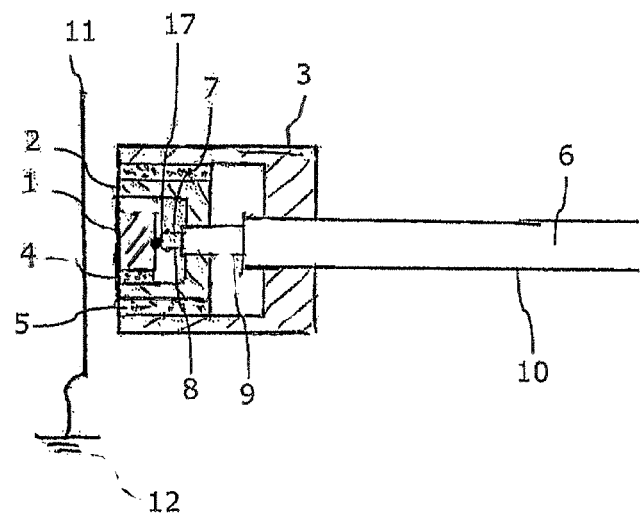

CAPACTIVE PRESSURE SENSOR INCORPORATING A TEMPERATURE MEASUREMENT AND COMPATIBLE WITH HOT ENVIRONMENTS

TECHNICAL FIELD

The present invention relates to a capacitive pressure sensor compatible with low to high temperature applications which integrates a temperature probe.

The field of the invention is more particularly but in a non-limiting way the one of gas turbine instrumentation, as well as aircraft reactors but also the nuclear, automotive and offshore fields.

STATE OF PRIOR ART

Gas turbine manufacturers use pressure sensors to check the behaviour of turbines on a test bench upon development but also upon use. Temperatures often exceed 600° C. and the pressure measurement is carried out by sensors being offset in areas where the temperature does not exceed a few hundreds degrees. This technique requires heavy mechanical interfaces and the pressure dynamic measurement can be degraded because of the transfer function of the mechanical interface.

Manufacturers increasingly want to carry out a static and dynamic pressure measurement in situ, that is in areas the temperature of which ranges from room temperature to about 800° C. for compressors, up to more than 1000° C. for high pressure turbines. Sensors must be able to measure pressures in the order of 40 bars and under considerable mechanical vibration and very oxidising chemical environment conditions. The technology to be implemented has thus a crucial importance and has led to numerous developments.

Among usable techniques, known are the pressure sensors based on capacitive sensors, the principle of which consists in measuring the displacement of the membrane under the effect of the pressure difference by measuring the capacitive coupling between this membrane and an electrode.

Document EP2075563 to Guo et al., is known, which discloses a pressure sensor compatible with high temperature applications. This sensor consists of a reference chamber and a pressure chamber separated by a tight membrane. The deformation of the membrane is measured by a triaxial structure capacitive sensor comprising a centre measurement electrode, surrounded with a guard which is maintained at the same potential as the electrode, and with a ground consisting of the body of the sensor. This active guard triaxial structure is essential to be able to carry out good quality capacitive measurements in noisy environments.

The circular shaped membrane is integral with walls on the perimeter thereof and undergoes bulging through elastic deformations under the effect of a pressure difference. The capacitive sensor substantially measures the deflection of this displacement in the centre of the cavity. To calculate pressure, it is necessarily to know the deformation mode of this membrane as a function of pressure, which depends as a first approximation on the material, its thickness, its Young's modulus as well as expansion coefficient. The problem is that all these parameters strongly depend on temperature, the variation amplitudes of which can be considerable in targeted applications.

The solution provided in EP2075563 is to equip the sensor with a membrane machined into a material (Haynes 230 alloy) selected to have Young's modulus and expansion coefficient variations as a function of temperature that are less significant than those of more conventional materials such as Inconel 750 which is often used for making such sensors. However, when temperature is unknown, the uncertainty on the pressure measurement is simply reduced but remains significant.

Document U.S. Pat. No. 3,948,102 to Grant is known, which discloses a membrane pressure sensor also based on a triaxial capacitive sensor. A thermocouple is added to the sensor to measure temperature and correct the pressure measurement. However, the thermocouple is fastened to the sensor ground, outside the triaxial structure of the capacitive sensor, at a distance relatively far from the membrane and it is connected to electronics through two separated wires. In other words, it is juxtaposed rather than integrated to the sensor and is thus not in optimum conditions, in terms of measurements (the measured temperature can significantly differ from that of the membrane) as well as in terms of mechanical integration (the connections are bulky).

To measure temperature very close to the membrane and optimize the mechanical integration, the thermocouple must be directly inserted into the capacitive sensor.

Document EP0334441 to Bailleul et al., is known, which discloses a coaxial capacitive sensor intended to be used in dynamic measurements in turbo-machines, wherein the bonded wire of the sensor electrode is replaced by a thermocouple welded to the electrode. However, this sensor can only be used for dynamic measurements of capacitance variations. Indeed, the method being used results in stray capacitances in the cable, which are variables and several orders of magnitude higher than the capacitance measured by the sensor. This problem in part comes from the guardless coaxial configuration of the sensor. It is also dramatically exacerbated by the presence of the further wire of the thermocouple. Indeed, in the configuration described in EP0334441, both wires of the thermocouple increase the stray capacitance. The integration of the thermocouple such as described in EP0334441 thus results in a degradation of the sensor performance which is unacceptable for static or absolute precision measurements and therefore, de facto, the solution provided in EP0334441 is not applicable to pressure measurements.

The problem is all the more significant that in applications of measurements on turbines, the cable should generally be several meters long to be able to offset electronics from hot areas.

Document FR2756048 to Rozière is known, which describes floating bridge electronics for making high accuracy capacitive measurements with triaxial sensors. For the purpose of limiting to a maximum the stray capacitances giving rise to disturbances, a feature is that it includes a floating part referenced to the AC potential of the guard, which is identical to that of the electrode.

Document FR2608751 to Bruère et al., is known, which describes electronics for making high accuracy capacitive measurements with triaxial sensors. The electronics are referenced to the general ground but the measurement electronic and the guard are excited at a same AC potential
by means of transformer inserted in series between the electrodes and electronics and excited by a sinusoidal generator.

The purpose of the present invention is to provide a capacitive pressure sensor compatible with high temperature applications, which integrates a temperature probe in the capacitive sensor.

DESCRIPTION OF THE INVENTION

This objective is achieved by a capacitive measurement device comprising first measurement means designed to carry out a first measurement and/or detection function in relation to an object placed nearby, said first measurement means comprising:

a body of a substantially electrically conductive material, a capacity electrode of a substantially electrically conductive material, and a guard electrode placed between the body and the capacitive electrode and electrically insulated from the body on the one hand and from the capacitive electrode on the other hand by dielectric elements, excitation means which maintain the capacitive electrode and the guard electrode to a substantially identical AC electrical potential, first electronic means, connected to the capacitive and guard electrodes, for measuring the capacitance between said capacitive electrode and said object, characterised in that it further comprises second measurement means designed to carry out a second measurement function, which are placed substantially within said body and in the vicinity of either of the capacitive or guard electrode, and maintained by the excitation means to a AC electrical potential substantially identical to that of the guard electrode.

Advantageously, the device according to the invention can further comprise a triaxial cable including a centre conductor connected to the capacitive electrode, a guard shielding connected to the guard electrode and a ground shielding connected to the body, and be characterised in that the second measurement means comprise at least one further conductor inserted in the triaxial cable, and connecting the additional sensor to second electronic means coupled to said second measurement means.

The further conductor can be inserted within the ground shielding of the cable, or within the guard shielding.

The centre point of the device according to the invention is a capacitive sensor for making high accuracy measurements in noisy environments, thanks to the active guard technique. This technique consists in protecting the capacitive measurement electrode and the conductor which connects it to the electronics from external disturbances, by surrounding it with a guard at the same potential that prevents stray capacitances from occurring.

These sensors are well suited to a manufacture compatible with high operating temperatures, of 600° C. or more. They can be made with a cylindrical structure with a capacitive measurement electrode in the centre, and a ring shaped guard electrode and a body for fastening the sensor which are concentrically provided. The electrodes are insulated from each other or from the body by electric elements such as ceramics.

The electrodes and the body can be made of metals the melting point of which is very high such as platinum (for the electrode) or more commonly of alloys or superalloy withstanding very high temperatures. Metals are preferably selected with an expansion coefficient close to that of ceramics to restrict mechanical stresses. These metals can be Kovar or platinum for very high temperatures. The assembly of metal and ceramic elements can be performed by solders or brazes or bonding using refractory cements.

These sensors are connected to electronics using a long triaxial structure cable and with a mineral insulator for the hot area. For high performance capacitive measurements, it is essential to use a triaxial structure cable and that the centre conductor(s) should substantially be at the same potential as that of the guard in a given section of the cable.

An object of the present invention is to provide an additional sensor in the capacitive sensor without markedly disturb its performances. This result can be obtained because the additional sensor is electrically floating and globally excited at the same AC voltage as the guard. At the excitation frequency, it thus appears as an element of the guard, or of the electrode if in contact with the same.

Another object of the present invention is to connect this sensor to the offset electronics through the same cable. This aspect is particularly important for measurements at temperatures where it is necessary to use stiff fragile cables with mineral insulators. Use of the same cable without introducing such disturbances such as stray capacitances between wires is also only possible because the additional sensor and its wires are subjected to the same voltage as the guard.

Gathering two sensors generally allows for an integration gain in particular in the case where accesses for sensors on a machine are limited, but it is also essential in some applications such as pressure measurement where it is very important to measure the temperature as close as possible to the place of the pressure measurement, that is at the capacitive electrode.

Of course, applications of the present invention are not limited to the field of high temperature measurements nor to the field of pressure or temperature measurements.

It is necessary in a device according to the invention to provide a real active guard wherein the guard and the capacitive electrode are really subjected to the same floating potential, and to extend this guard to additional components such as sensors in a manner which is compatible with operating constraints of these components (power supply, signal conditioning, . . . ). For this, two embodiments are provided for the electronics. Of course, the implementation of other embodiments giving the same result would remain within the scope of the invention.

According to one embodiment, the electronics can be designed such that the first and second electronic means are at least in part floating and referenced to the potential of the guard, the excitation means being integrated to the floating part of said first and/or second electronic means.

A detailed description of this kind of electronics can be found in FR2756048 as far as the capacitive part is concerned. In this embodiment, the input stage at least of the electronics (of the first and second means) is floating and referenced to the same potential as that of the guard. This input stage can include a charge amplifier for the capacitive measurement and for example a voltage amplifier for reading the additional sensor. The guard electrode is directly connected to the reference potential of the floating electronics on the electronic means side. In the case for example where the additional sensor is a thermocouple welded to the capacitive electrode, a wire of the thermocouple is connected to the charge amplifier and the second wire of the thermocouple is connected to the input of the voltage amplifier.

A synchronous amplification and demodulation circuit enable a proportional CC signal to be provided to the capacitance measured by the sensor. A feedback loop can also be used to obtain an electric signal inversely proportional to the capacitance for this signal to be proportional to the displacement of the membrane, for example therefore with the pressure applied in the case of an application to the pressure measurement.

The power supply of the floating part of the electronics can be carried out for example with a DC-DC voltage converter or choke coils.

The electronic links between the floating and non-floating parts (referenced to the general ground) can be made for example by means of differential amplifiers or optocouplers.

According to another embodiment, the electronics can be designed such that the excitation means comprise a transformer the primary circuit of which is excited by an AC voltage source, and the secondary circuit of which comprises a winding consisting of a shielding cable, said cable comprising:

a guard shielding connected on one side of the transformer to the guard electrode of the sensor, and on the other side, to the ground of the first and second electronic means, conductors connected to the capacitive electrode and the additional sensor on one side of the transformer, and to the first and second electronic means on the other side.

A detailed description of this type of electronics can be found in FR2608751 as far as the capacitive part is concerned. It is based on the use of a transformer the primary circuit of which is excited by an AC voltage. The secondary circuit of the transformer consists of a winding of a shielded cable making up the guard, and bonding wires between the capacitive electrode and the additional sensor on one hand, and the electronic means on the other hand. The shielding of this secondary circuit is connected to the guard on the sensor side and to the ground of the electronics on the electronics side. In the case for example where the additional sensor is a thermocouple welded to the capacitive electrode, both wires of the secondary circuit making up the thermocouple are connected to the capacitive electrode on the sensor side and to the electronics on the electronic means side. One of both wires can be connected to a charge amplifier in order to convert the capacitance created between an object such as a membrane and the electrode of the sensor into an electric signal. The second wire which is naturally to the same AC potential as the first wire can be connected to a CC voltage amplifier in order to provide the CC electric signal created by the thermocouple. The charge amplifier and the voltage amplifier are referenced to the same general ground potential as that of the object to be measured (the membrane), the external shielding of the cable as well as the body of the capacitive sensor.

A synchronous amplification and demodulation circuit enables a CC signal proportional to the capacitance measured by the sensor to be provided. A feedback loop can also be used to obtain an electric signal inversely proportional to the capacitance so that this signal can be proportional to the displacement of a membrane, for example therefore with the pressure applied in the case of an application to a pressure measurement.

According to a preferred embodiment, the device according to the invention can be implemented in a pressure sensor, further comprising a membrane of a substantially electrically conductive material, which membrane:

is fastened to the body so as to be substantially parallel to the surface of the capacitive electrode, and to be deformable under the effect of a pressure difference applied on either face thereof, is capacitively coupled to the capacitive electrode which measures the deformation thereof.

The capacitive sensor can thus be used for manufacturing a pressure sensor, by measuring the displacement of the membrane under the effect of the pressure. This membrane should comprise a substantially electrically conductive material, to be able to be capacitively coupled to the measurement electrode. It can be metallic, or made of a dielectric material metallized on the electrode side. This dielectric can be for example ceramics for high temperature applications. In a hot environment, all the materials usable to make a membrane (refractory metal alloy, ceramics . . . ) have mechanical characteristics which strongly change with high temperatures and it is essential to perform a heat correction in order to perform an accurate measurement of pressure. The main parameter is the elastic modulus (called Young's modulus) of the membrane which determines the membrane deformation sensitivity to pressure. This parameter changes from 15 to 50% depending on the type of material for temperatures ranging from room temperature to 800° C. To obtain a pressure measurement accuracy lower than one percent, it is necessary to correct the drift in the membrane deformation measurement with temperature.

Advantageously, the electronics can then be equipped with a calculator which corrects in real time the capacitive measurement as a function of the measured temperature.

Advantageously, the material making up the membrane can be selected, no longer necessarily for its heat stability since the temperature is measured, but such that its expansion coefficient is close to that of the entire sensor, in order to limit the not very controllable stresses and deformations they cause and which also give rise to errors. The limitation in stresses also enables the irreversible degradation risks of the sensor, in particular cracks in the dielectrics and tightness losses, to be limited.

The membrane can comprise a material selected so that the expansion coefficient of said membrane is substantially identical to the expansion coefficient of the device, that is to the whole expansion coefficient of the capacitive sensor.

According to embodiments:

the additional sensor can comprise a temperature sensor, the temperature sensor can comprise a thermistance, the temperature sensor can comprise a thermocouple.

The point of the temperature measurement is not limited to the application to the pressure sensor. It can be for example advantageously added to capacitive sensors measuring vane clearances (vane and blade set or tip timing) and provide useful information to the operator aiming at performing more relevant diagnostics on the behaviour of the system under test, reducing the number of temperature sensors and correcting the thermal drift in the sensor.

The technology commonly used for measuring a very high temperature above 600° C. is the thermocouple. A thermocouple consists of two wires of different materials welded to each other on the side of the area to be measured. This end makes up the temperature probe. At the other end of both wires, a potential difference occurs and changes as a function of the temperature seen by the temperature probe.

Advantageously, the thermocouple can be welded to the capacitive electrode, and the triaxial cable can comprise two centre conductors connected to both wires of the thermocouple, one of said conductors being simultaneously connected to the first and second electronic means, the other conductor being only connected to the second electronic means.

According to another aspect, the invention consists in implementing a triaxial cable equipped with two wires to make a thermocouple. Both these wires are welded to the back of the capacitive measurement electrode. Both wires are at the same potential as the guard, one of both wires is connected to the input stage of the capacitive detection electronics (the first means) and the second wire is connected to electronics which measures the potential difference of both wires (the second means). If both wires of the thermocouple are properly referenced to the guard potential, these wires do no add any capacitive leak seen by the electronics. To ensure that they are perfectly placed to the guard potential, both wires of the thermocouple can be decoupled using a capacitor connected on these wires on the electronics side, in a parallel on the amplifier input of the thermocouple. Of course, this decoupling mode is applicable to any type of sensors, regardless of the number of bonding wires with the electronics.

According to other embodiments, the triaxial cable can comprise three centre conductors, one of which is connected to the capacitive electrode and the two other of which are connected to both wires of the thermocouple, the thermocouple can also be welded to the guard electrode.

According to another aspect, a pressure sensor integrating a device according to the invention is provided.

According to yet another aspect, a pressure measurement method implementing a device according to the invention is provided, comprising:

measuring the deformation of a membrane under the effect of a pressure difference applied on either side of said membrane, which deformation is measured by means of a capacitive sensor comprising a capacitive electrode and a guard electrode substantially excited at the same AC electric potential, measuring a temperature by means of a temperature sensor provided in the vicinity of the capacitive measurement electrode, which temperature sensor is substantially excited at the same AC electric potential as the guard electrode and the capacitive electrode, calculating a pressure based on a transfer function determined beforehand, relating the measure of the capacitive sensor to the pressure difference applied, characterised in that the transfer function is adjusted depending on the measured temperature.

Advantageously, the transfer function can include an elastic deformation pattern of the membrane, and the values of at least one of the expansion coefficient and Young's modulus of the membrane can be selected depending on the measured temperature;

the transfer function can include a plurality of calibration curves set for determined temperature ranges, and in that the curve applied is selected depending on the measured temperature;

the signal generated by the voltage amplifier of the thermocouple can be recovered by an analog or digital circuit to automatically correct the natural thermal drift in the pressure sensor. For example, a microprocessor can be used to carry out an automatic correction in real time and provide an analog voltage which represents the real static and dynamic pressure applied onto the membrane.

The device and the method according to the invention enable both static and dynamic measurements to be performed. They can advantageously find applications in field other than turbine instrumentation. There can be cited, by way of non-limiting examples, the instrumentation of spark ignition emission engines and measurements in a nuclear environment.

DESCRIPTION OF THE FIGURES AND EMBODIMENTS

Figure 2:
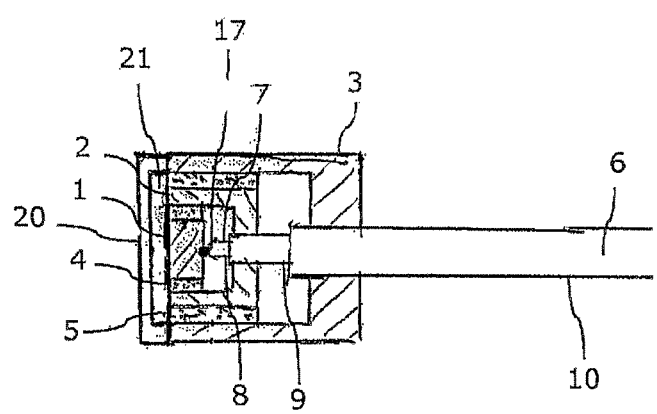
Figure 3:
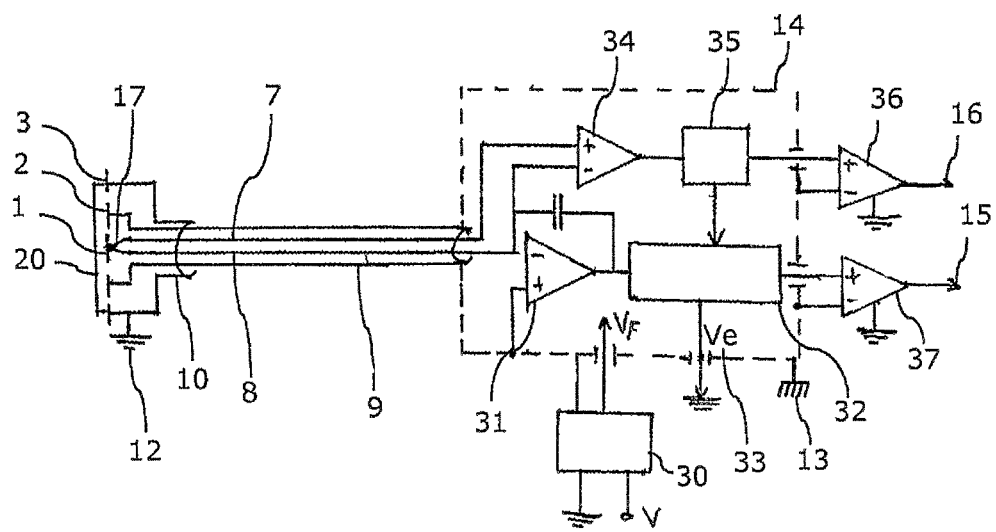
Figure 4:
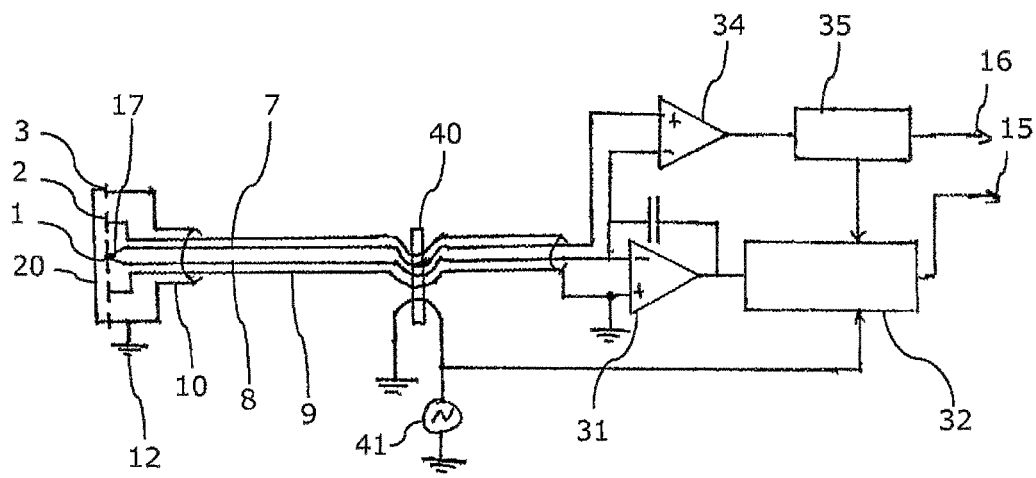

Further advantages and features of the invention will appear upon reading the detailed description of implementations and embodiments in no way limiting, and the following appended drawings:

FIG. 1 illustrates a diagram of a capacitive sensor equipped with a thermocouple, FIG. 2 illustrates a diagram of a pressure sensor equipped with a thermocouple, FIG. 3 illustrates a first embodiment of the electronics of a pressure sensor equipped with a thermocouple, based on floating bridge electronics, FIG. 4 illustrates a second embodiment of the electronics of a pressure sensor equipped with a thermocouple, based on a transformer guard generation.

According to a preferable but in no way limiting embodiment, the device according to the invention is substantially cylindrical. The embodiment shown enables sensors operating at temperatures higher than 600° C. to be made.

In reference to FIG. 1, the capacitive sensor comprises the following elements:

a measurement electrode 1, which may be made of platinum, a Dilver type alloy, a refractory metal alloy or a superalloy, a guard electrode 2, which may be made of platinum, a Dilver type alloy, a refractory metal alloy or a superalloy, a body 3, which may be made of platinum, a Dilver type alloy, or a refractory metal alloy or a superalloy, dielectric rings 4 and 5, which can be made of refractory ceramics, for example alumina-($Al_2O_3$) or boron nitride-(NB) based, a triaxial cable 6, which comprises two sensor conductors 7 and 8, a guard shielding 9 connected to the guard electrode 2, and a ground shielding 10 connected to the body 3 of the sensor and to the reference ground 12 on the electronics side, a thermocouple 17 welded to the measurement electrode 1, and connected to both wires 7 and 8.

Preferably, the cable 6 is a cable with a mineral insulator comprising Inconel conductors and a mineral insulator, for example alumina powder-($Al_2O_3$), MgO powder-, another oxide mixture-based, or any other mineral insulator.

Pieces of the sensor are assembled, in a non-limiting manner, by soldering or brazing, or by bonding with a ceramic type adhesive, for example alumina-($Al_2O_3$) based.

In the example of FIG. 1, the sensor measures the distance between the electrode 1 and an object 11 of an electrically conductive material coupled to the reference ground 12.

In reference to FIG. 2, the object 11 is replaced by a membrane 20 which deforms under the effect of the pressure difference between the front face of the sensor and the cavity 21. This membrane can for example be in Inconel type superalloy or any other alloy type but also in metallized ceramics.

This membrane 20 is connected to the reference ground 12 through the body 3 and the ground shielding 10.

In reference to FIG. 3, according to a first embodiment, the capacitive pressure sensor and the thermocouple 17 as a whole are controlled by so-called floating bridge electronics, the part 31 32 37 connected to the capacitive measurement of which is detailed in document FR2756048. This electronics comprises a floating part 14, referenced to the potential 13. The guard electrode 2 is excited to this potential 13 through the guard shielding 9 of the cable. This AC potential 13 is generated with respect to the reference ground 12 by an oscillator 33. The measurement electrode and the thermocouple 17 are also excited at this potential 13, so that no substantial potential difference occurs at the excitation frequency between the wires 7 and 8 and the ground shielding 9 on the one hand, and the measurement 1 and guard 2 electrodes and the the thermocouple 17 on the other hand, so as to prevent stray capacitances from occurring.

The floating part 14 of the electronics is powered by a DC-DC voltage converter 30, the output of which is referenced to the floating potential 13. These electronics comprise, in a non-limiting way:

for the capacitive detection, a charge amplifier 31 and a capacitance meter 32 which can be analog or digital, for the thermocouple, a differential amplifier 34 which can also be analog or digital.

The floating electronics 14 can be interfaced with the rest of the electronics to the reference ground by differential amplifiers 36 and 37 for transmitting analog data, or by optocouplers.

In reference to FIG. 4 according to a second embodiment, the electronics does not comprise any floating part, but implements a transformer to generate the guard. A detailed description of this kind of electronics can be found in document FR2608751 as far as the capacitive part is concerned.

The guard is generated by a transformer 40. The primary circuit of the transformer is excited by an oscillator 41, also used by the capacitance meter 32 for demodulating the capacitive signal. The secondary circuit of the transformer 40 comprises the guard shielding 9 and the wires 7 and 8 connected to the measurement electrode 1 and the thermocouple 17. The guard shielding is connected to the reference ground on the electronics side. The transformer induces by mutual inductance a voltage substantially identical in all the conductors 7, 8, 9 of the secondary circuit. The measurement 1 and guard 2 electrodes and the thermocouple 17 are also subjected thereto. Thus, no substantial potential difference appears at the excitation frequency between the wires 7 and 8 and the guard shielding 9 on the sensor side on the one hand, and the measurement 1 and guard 2 electrodes and the thermocouple 17 on the other hand, so as to prevent stray capacitances from occurring. Of course, the transformer is preferably placed in the immediate vicinity of the electronics.

The electronics comprises, in a non-limiting way:
for the capacitive detection, a charge amplifier 31 and a capacitance meter 32 which can be analog or digital,
for the thermocouple, a differential amplifier 34 which can also be analog or digital.

According to particular embodiments, the electronics can also comprise a correction circuit 35, being analog or based on a microprocessor or FPGA, which makes use of the temperature measure and transmits it to the capacitance meter 32, such that the same (also analog or digital) directly provides a pressure measure corrected of the temperature influence.

By way of illustration, a capacitive pressure sensor equipped with a measurement electrode having a 3 mm diameter and a membrane placed about 100 μm away from the electrode measures a rated capacitance of about 0.62 pF. Under a 40 bar pressure difference, a metal membrane bends about 10 μm. The corresponding variation in the capacitance is 0.062 pF (for 40 bars). To obtain a measurement accuracy lower than 1% of the measurement extent, the capacitance should be measured with an error lower than 0.00062 pF. If a coaxial cable without mineral insulator guard of a length of several meters is used such as in document EP0334441, the capacitance only due to the cable seen by the capacitance meter is more than 1000 pF. This capacitive leak prevents any pressure measurement. With a triaxial cable even if it is equipped with two wires for the thermocouple and connected to one of the electronics described in the present document (floating or with a transformer), the capacitive leak due to the cable is lower than 0.0001 pF, which corresponds to an (absolute) measurement error lower than 0.065 bars, that is 0.16% of the measurement extent.

Of course, the invention is not limited to the examples just described and numerous changes can be made to these examples without departing from the scope of the invention.

The invention claimed is:

1. A capacitive measurement device comprising first measurement means designed to carry out at least one of a first measurement and a detection function in relation to an object placed near said first measurement means comprising:
    a body of an electrically conductive material, a capacity electrode of an electrically conductive material, and a guard electrode placed between the body and the capacitive electrode and electrically insulated from the body on the one hand and from the capacitive electrode on the other hand by dielectric elements;
    excitation means which maintain the capacitive electrode and the guard electrode to an identical AC electrical potential;
    first electronic means connected to the capacitive and guard electrodes for measuring the capacitance between said capacitive electrode and said object; and
    second measurement means designed to carry out a second measurement function, which are placed within said body and in the vicinity of either the capacitive or guard electrode, and maintained by the excitation means to a AC electrical potential identical to that of the guard electrode.

2. The device according to claim 1, further comprising a triaxial structure cable including a center conductor connected to the capacitive electrode, a guard shielding connected to the guard electrode and a ground shielding connected to the body,
    wherein the second measurement means comprise at least one further conductor inserted in the triaxial cable, and connecting the further sensor to second electronic means coupled to said second measurement means.

3. The device according to claim 1, wherein the first and second electronic means are at least in part floating and referenced to the potential of the guard, the excitation means being integrated in the floating part of at least one of said first and second electronic means.

4. The device according to claim 1, wherein the excitation means comprise a transformer the primary circuit of which is excited by a AC voltage source, and the secondary circuit of which comprises a winding consisting of a shielded cable, said cable comprising:
    a guard shielding connected on one side of the transformer to the guard electrode of the sensor, and on the other side, to the ground of the first and second electronic means,
    conductors connected to the capacitive electrode and the further sensor on one side of the transformer, and to the first and second electronic means on the other side.

5. The device according to claim 1, further comprising a membrane of an electrically conductive material, which membrane:
    is fastened to the body so as to be parallel to the surface of the capacitive electrode, and to be deformable under the effect of a pressure difference applied on either face thereof,
    is capacitively coupled to the capacitive electrode which measures the deformation thereof.

6. The device according to claim 5, wherein the membrane comprises a material selected so that the expansion coefficient of said membrane is identical to the expansion coefficient of the device.

7. The device according to claim 1, wherein the further sensor comprises a temperature sensor.

8. The device according to claim 7, wherein the temperature sensor comprises a thermocouple.

9. The device according to claim 8, wherein:
    the thermocouple is welded to the capacitive electrode, and
    the triaxial cable comprises two centre conductors connected to both wires of the thermocouple, one of said conductors being simultaneously connected to the first and second electronic means, the other conductor being only connected to the second electronic means.

10. The device according to claim 8, wherein the triaxial cable comprises three centre conductors, one of which being connected to the capacitive electrode and the two other ones being connected to both wires of the thermocouple.

11. The device according to claim 10, wherein the thermocouple is welded to the guard electrode.

12. A pressure sensor integrating a device according to claim 5.

13. A pressure measurement method implementing a device according to claim 1, comprising:

measuring the deformation of a membrane under the effect of a pressure difference applied on either side of said membrane, which deformation is measured by means of a capacitive sensor comprising a capacitive electrode and a guard electrode substantially excited at the same AC electric potential, measuring a temperature by means of a temperature sensor provided in the vicinity of the capacitive measurement electrode, which temperature sensor is substantially excited at the same AC electric potential as the guard electrode and the capacitive electrode, calculating a pressure based on a transfer function determined beforehand, relating the measure of the capacitive sensor to the pressure difference applied, and the transfer function is adjusted depending on the measured temperature.

14. The method according to claim 13, wherein the transfer function includes an elastic deformation pattern of the membrane, and in that the values of at least one of the expansion coefficient and Young modulus of the membrane are selected depending on the measured temperature.

15. The method according to claim 13, wherein the transfer function includes a plurality of calibration curves set for determined temperature ranges, and in that the curve applied is selected depending on the measured temperature.

\* \* \* \* \*